(12) United States Patent
Nozaki et al.

(10) Patent No.: US 8,451,350 B2
(45) Date of Patent: May 28, 2013

(54) SOLID-STATE IMAGING DEVICE, CAMERA MODULE, AND IMAGING METHOD

(75) Inventors: Masahiko Nozaki, Kanagawa (JP); Takeshi Nakano, Kanagawa (JP); Junichi Hosokawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 285 days.

(21) Appl. No.: 13/049,334

(22) Filed: Mar. 16, 2011

(65) Prior Publication Data
US 2011/0317055 A1 Dec. 29, 2011

(30) Foreign Application Priority Data
Jun. 29, 2010 (JP) .................... 2010-147432

(51) Int. Cl.
*H04N 9/64* (2006.01)
(52) U.S. Cl.
USPC .......................................... 348/243
(58) Field of Classification Search
USPC .............. 348/207.99, 222.1, 241, 243, 246
See application file for complete search history.

(56) References Cited

U.S. PATENT DOCUMENTS

| | | | |
|---|---|---|---|
| 7,427,735 B2 * | 9/2008 | Eskerud | 250/208.1 |
| 7,701,493 B2 * | 4/2010 | Mauritzson | 348/241 |
| 7,760,258 B2 * | 7/2010 | Huang et al. | 348/294 |
| 7,800,042 B2 * | 9/2010 | Eskerud | 250/208.1 |
| 8,018,505 B2 * | 9/2011 | Suzuki | 348/245 |
| 2007/0131846 A1 * | 6/2007 | Eskerud | 250/208.1 |
| 2008/0218615 A1 * | 9/2008 | Huang et al. | 348/294 |
| 2008/0284889 A1 * | 11/2008 | Kinoshita | 348/308 |
| 2008/0315073 A1 * | 12/2008 | Eskerud | 250/208.1 |
| 2009/0040328 A1 * | 2/2009 | Suzuki | 348/222.1 |

FOREIGN PATENT DOCUMENTS

| | | |
|---|---|---|
| JP | 2008-131546 | 6/2008 |
| JP | 2008-148063 | 6/2008 |

* cited by examiner

*Primary Examiner* — Nicholas Giles
(74) *Attorney, Agent, or Firm* — Oblon, Spivak, McClelland, Maier & Neustadt, L.L.P.

(57) ABSTRACT

According to one embodiment, a third optical black portion is arranged in parallel with a first optical black portion in a row direction and in parallel with a second optical black portion in column direction. At least one of the vertical line correction circuit and the horizontal line correction circuit adds/subtracts arithmetic average of the third black level signal generated by the third optical black portion.

18 Claims, 2 Drawing Sheets

SOLID-STATE IMAGING DEVICE, CAMERA MODULE, AND IMAGING METHOD

CROSS-REFERENCE TO RELATED APPLICATIONS

This application is based upon and claims the benefit of priority from the prior Japanese Patent Application No. 2010-147432, filed on Jun. 29, 2010; the entire contents of all of which are incorporated herein by reference.

FIELD

Embodiments described herein relate generally to a solid-state imaging device, a camera module, and an imaging method.

BACKGROUND

In the related art, there is known a CMOS image sensor having a column type analog-to-digital conversion circuit (column type A/D conversion circuit) as an example of a solid-state imaging device. Image quality in the CMOS image sensor having the column type A/D conversion circuit may be degraded, for example, due to vertical line noise generated in each vertical line (column) or horizontal line noise generated in each horizontal line (row). The vertical line noise is principally generated due to unevenness of characteristics in each element of the A/D conversion circuit. The horizontal line noise includes noise generated during reset in the read operation for each horizontal line (reset noise).

As a technique for reducing vertical line noise or horizontal line noise, for example, there is known a technique of collectively subtracting an average of an output signal of an optical black (OB) portion from an output signal of an effective pixel portion for each vertical line and for each horizontal line. The effective pixel portion includes pixel cells having a photoelectric conversion element arranged in parallel and outputs an effective pixel signal depending on the light intensity. The OB portion includes pixel cells having an optically-shielded photoelectric conversion element arranged in parallel and outputs a black level signal representing a lowest gradation level. Since a component generating the vertical line noise or the horizontal line noise is equally contained in the effective pixel signal and the black level signal, the vertical line noise or the horizontal line noise can be reduced through the adding/subtracting process.

Recently, as the camera module becomes high resolution, and pixels become miniaturized, a defective portion (hereinafter, referred to as a "defect") in a digital image signal caused by a failed pixel becomes an issue. If the average of the black level signal is collectively added/subtracted when the defect is generated in the OB portion, influence of the defect in the OB portion is collectively applied to the effective pixel signal, and the noise correction may be erroneously carried out. In the technique for suppressing influence of the defect generated in the OB portion in the related art, while erroneous noise correction caused by the defect can be alleviated, an effect of suppressing at least one of the vertical line noise and the horizontal line noise may be degraded.

DETAILED DESCRIPTION

In general, according to one embodiment, a solid-state imaging device includes a pixel unit, an A/D conversion circuit, and a signal processing circuit. In the pixel unit, a photoelectric conversion element and a detection portion are two-dimensionally arranged. The detection portion converts a signal charge from the photoelectric conversion element into a voltage. The A/D conversion circuit converts the signal read from the pixel unit into a digital signal. The signal processing circuit carries out operational processing of the digital signal obtained from the A/D conversion circuit. The pixel unit has an effective pixel portion and an optical black portion. The effective pixel portion generates an effective pixel signal depending on the light amount incident to the photoelectric conversion element. The optical black portion generates a black level signal representing a lowest gradation level when the photoelectric conversion element is optically shielded. The optical black portion includes a first optical black portion, a second optical black portion, and a third optical black portion. The first optical black portion is arranged in parallel with the effective pixel portion in a column direction. The first optical black portion generates a first black level signal. The second optical black portion is arranged in parallel with the effective pixel portion in a row direction. The second optical black portion generates a second black level signal. The third optical black portion is arranged in parallel with the first optical black portion in a row direction and in parallel with the second optical black portion in a column direction. The third optical black portion generates a third black level signal. The signal processing unit has a vertical line correction circuit and a horizontal line correction circuit. The vertical line correction circuit carries out arithmetic averaging of the first black level signal for each column and adds/subtracts a result of the arithmetic average to/from the effective pixel signal. The horizontal line correction circuit carries out arithmetic averaging of the second black level signal for each row and adds/subtracts a result of the arithmetic average to/from the effective pixel signal. At least one of the vertical line correction circuit and the horizontal line correction circuit further adds/subtracts the arithmetic average of the third black level signal to/from the first or second black level signal.

Exemplary embodiments of a solid-state imaging device, a camera module, and an imaging method will be explained below in detail with reference to the accompanying drawings. The present invention is not limited to the following embodiments.

Figure 1:
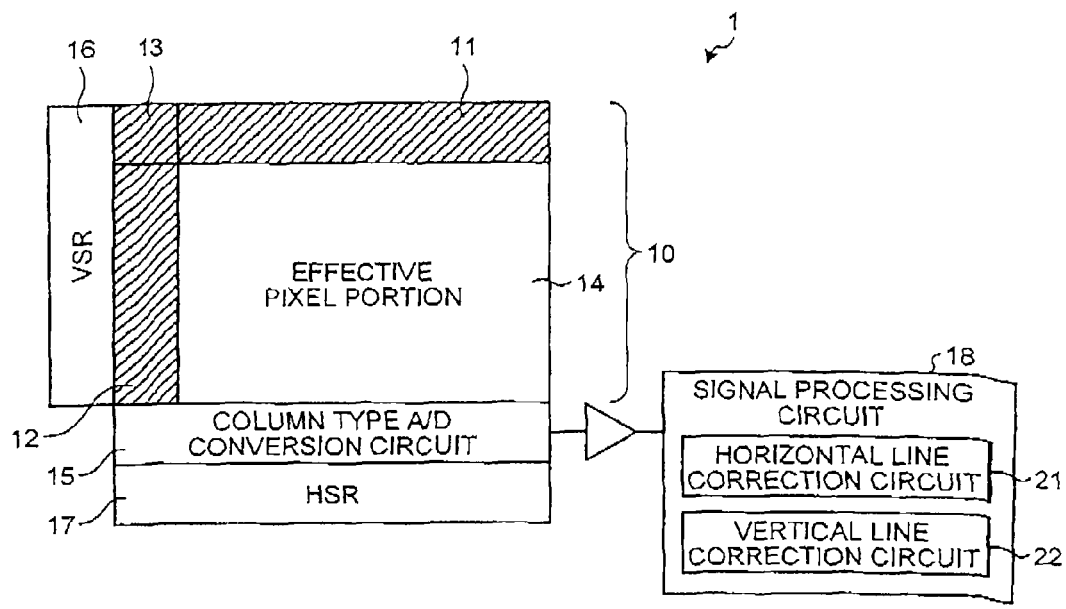
FIG. 1 is a block diagram illustrating a schematic configuration of a CMOS image sensor as a solid-state imaging device according to a first embodiment.
Figure 2:
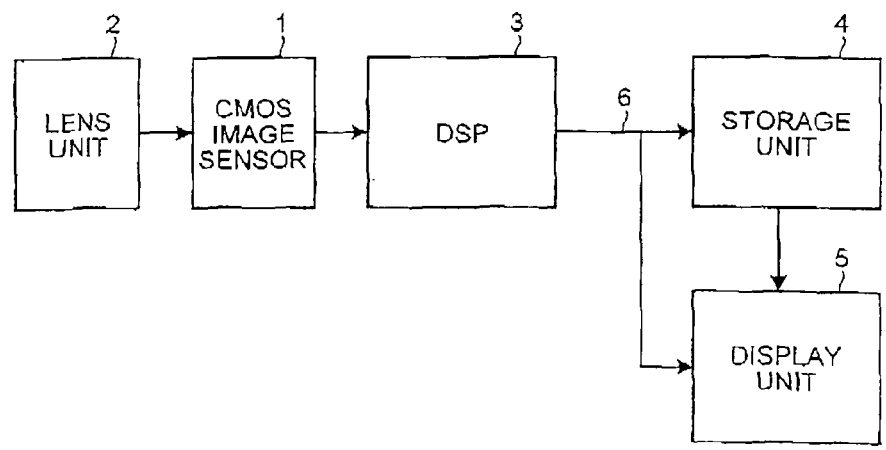
FIG. 2 is a block diagram illustrating a schematic configuration of a camera module having a CMOS image sensor of FIG. 1.

FIG. 1 is a block diagram illustrating a schematic configuration of a CMOS image sensor as a solid-state imaging device according to a first embodiment. FIG. 2 is a block diagram illustrating a schematic configuration of a camera module having the CMOS image sensor of FIG. 1.

The camera module includes a lens unit 2, a CMOS image sensor 1, a digital signal processor (DSP) 3, a storage unit 4, and a display unit 5.

The lens unit 2 includes an optical lens, an IR cutoff filter, and the like. The optical lens receives light from a subject and focuses it on the CMOS image sensor 1. The IR cutoff filter removes infrared light from the incident light.

The CMOS image sensor 1 captures an image of the subject by converting the light received by the lens unit 2 into a signal charge. The CMOS image sensor 1 is provided with red (R), green (G), and blue (B) color filters in a Bayer array. The CMOS image sensor 1 generates an image signal (raw data) by sequentially receiving R, G, and B signals corresponding to the Bayer array for each pixel.

The DSP 3 carries out various kinds of image processing for the image signal from the CMOS image sensor 1. An image signal 6 from the DSP 3 is input directly to the display unit 5 or to the display unit 5 through the storage unit 4.

The storage unit 4 stores the image obtained by capturing of the CMOS image sensor 1. The display unit 5 displays the image in response to the image signal 6 from the DSP 3 or the storage unit 4. The display unit 5 is, for example, a liquid crystal display. The display unit 5 displays a through-the-lens image in response to the image signal 6 from the DSP 3. In addition, the display unit 5 displays the image stored in the storage unit 4 in response to the image signal 6 from the storage unit 4.

The CMOS image sensor 1 includes a pixel unit 10, a column type A/D conversion circuit 15, a vertical selection register (VSR) 16, a horizontal shift register (HSR) 17, and a signal processing circuit 18.

The pixel unit 10 includes a plurality of pixel cells. Each pixel cell has a photoelectric conversion element for converting the light from the subject into a signal charge and a detection portion for converting a signal charge from the photoelectric conversion element into a voltage (all of these are not shown for simplicity purposes). The pixel cells are arranged in a 2-dimensional direction including a vertical direction (column direction) and a horizontal direction (row direction).

The pixel unit 10 includes an effective pixel portion 14 for inputting light into the photoelectric conversion element and an OB portion for optically shielding the photoelectric conversion element. The effective pixel portion 14 generates an effective pixel signal depending on the light amount incident to the photoelectric conversion element. The OB portion generates a black level signal representing a lowest gradation level by optically shielding the photoelectric conversion element completely. The OB portion includes a first OB portion 11, a second OB portion 12, and a third OB portion 13.

The first OB portion 11 is a portion arranged over the effective pixel portion 14 out of the OB portion. The first OB portion 11 and the effective pixel portion 14 are arranged in parallel in a column direction. The first OB portion 11 generates a first black level signal.

The second OB portion 12 is a portion arranged in the left side of the effective pixel portion 14 out of the OB portion. The second OB portion 12 and the effective pixel portion 14 are arranged in parallel in a row direction. The second OB portion 12 generates the second black level signal.

The third OB portion 13 is a portion arranged in the left diagonal side of the effective pixel portion 14 out of the OB portion. The third OB portion 13 and the first OB portion 11 are arranged in parallel in a row direction. The third OB portion 13 and the second OB portion 12 are arranged in parallel in a column direction. The third OB portion 13 generates a third black level signal.

The column type A/D conversion circuit 15 is arranged under the effective pixel portion 14 and the second OB portion 12. The column type A/D conversion circuit 15 converts the signal read from the pixel cell of the pixel unit 10 into a digital signal. The VSR 16 selects the pixel cell from which the signal is to be read through the signal line by a row. The HSR 17 outputs the signal of the row selected by the VSR 16. The signal processing circuit 18 carries out operational processing of the digital signal obtained by the column type A/D conversion circuit 15 to obtain an image signal.

The signal processing circuit 18 includes a horizontal line correction circuit 21 and a vertical line correction circuit 22. The horizontal line correction circuit 21 carries out arithmetic averaging of the second black level signal from the second OB portion 12 for each row and adds/subtracts it to/from the effective pixel signal from the effective pixel portion 14. The vertical line correction circuit 22 carries out arithmetic averaging of the first black level signal from the first OB portion 11 for each column and adds/subtracts it to/from the effective pixel signal from the effective pixel portion 14.

The horizontal line correction circuit 21 removes the horizontal line noise equally contained in the effective pixel signal from the effective pixel portion 14 and the second black level signal from the second OB portion 12 through the adding/subtracting process. The vertical line correction circuit 22 removes vertical line noise equally contained in the effective pixel signal from the effective pixel portion 14 and the first black level signal from the first OB portion 11 through the adding/subtracting process. In addition, the signal processing circuit 18 removes horizontal line noise contained in the first OB portion 11 by adding/subtracting the arithmetic average of the third black level signal from the third OB portion 13 to/from the first black level signal before performing the arithmetic averaging of the first black level signal in the vertical line correction circuit 22.

Figure 3:
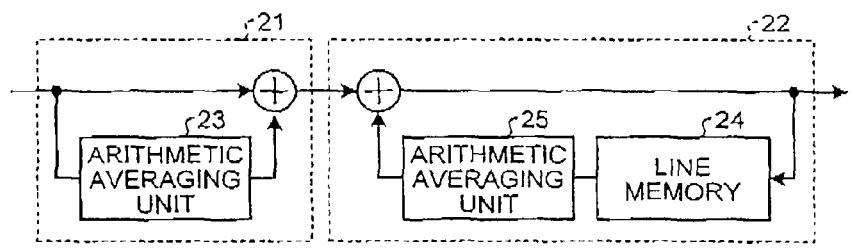
FIG. 3 is a block diagram illustrating configurations of a horizontal line correction circuit and a vertical line correction circuit.

FIG. 3 is a block diagram illustrating a configuration of the horizontal line correction circuit and the vertical line correction circuit. When the row of the first OB portion 11 is selected by the VSR 16, an arithmetic averaging unit 23 of the horizontal line correction circuit 21 obtains the arithmetic average of the third black level signal for each row. The horizontal line correction circuit 21 adds/subtracts the arithmetic average obtained by the arithmetic averaging unit 23 to/from the first black level signal and transmits the result to the vertical line correction circuit 22.

The vertical line correction circuit 22 temporarily stores the black level signal subjected to the adding/subtracting in the horizontal line correction circuit 21 in a line memory 24. An arithmetic averaging unit 25 obtains the arithmetic average of the black level signal read from the line memory 24 for each column. When the row of the effective pixel portion 14 is selected by the VSR 16, the horizontal line correction circuit 21 obtains the arithmetic average of the second black level signal for each row from the arithmetic averaging unit 23 and adds/subtracts the obtained arithmetic average to/from the effective pixel signal. The vertical line correction circuit 22 adds/subtracts the arithmetic average obtained by the arithmetic averaging unit 25 to/from the effective pixel signal subjected to the adding/subtracting in the horizontal line correction circuit 21.

In this manner, the solid-state imaging device carries out the vertical line correction using the vertical line correction circuit 22 after removing the horizontal line noise equally contained in the third black level signal read from the third OB portion 13 and the first black level signal read from the first OB portion 11 through the adding/subtracting process. If the solid-state imaging device carries out vertical line correction based on the black level signal with the horizontal line noise being removed, it is possible to improve precision of the vertical line correction. As a result, it is possible to improve image quality of the solid-state imaging device through high precision noise correction.

Furthermore, the signal processing circuit 18 removes vertical line noise contained in the second OB portion 12 by adding/subtracting the arithmetic average of the third black level signal from the third OB portion 13 to/from the second black level signal before performing the arithmetic averaging of the second black level signal in the horizontal line correction circuit 21.

When the row of the first OB portion 11 is selected by the VSR 16, the arithmetic averaging unit 25 of the vertical line correction circuit 22 obtains the arithmetic average of the third black level signal for each column. When the row of the effective pixel portion 14 is selected by the VSR 16, the vertical line correction circuit 22 adds/subtracts the arithmetic average obtained by the arithmetic averaging unit 25 to/from the second black level signal and transmits the result to the horizontal line correction circuit 21. The horizontal line correction circuit 21 obtains the arithmetic average of the black level signal subjected to the adding/subtracting in the vertical line correction circuit 22 for each row and adds/subtracts the obtained arithmetic average to/from the effective pixel signal.

The solid-state imaging device carries out horizontal line correction using the horizontal line correction circuit 21 after removing the vertical line noise equally contained in the third black level signal read from the third OB portion 13 and the second black level signal read from the second OB portion 12 through the adding/subtracting process. In the solid-state imaging device, it is possible to improve precision of the horizontal line correction by carrying out the horizontal line correction based on the black level signal with the vertical line noise being removed.

In the solid-state imaging device, it is possible to improve precision in both the vertical line correction and the horizontal line correction by removing both the horizontal line noise contained in the first OB portion 11 and the vertical line noise contained in the second OB portion 12. In addition, the solid-state imaging device may remove at least one of the horizontal line noise contained in the first OB portion 11 and the vertical line noise contained in the second OB portion 12.

Figure 4:
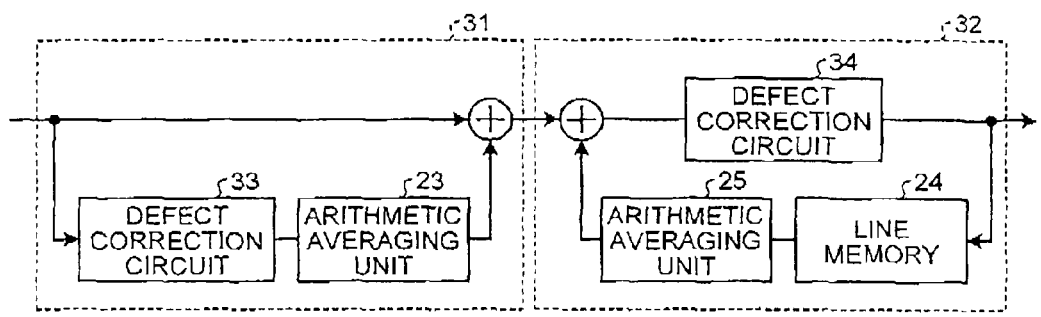
FIG. 4 is a block diagram illustrating configurations of a horizontal line correction circuit and a vertical line correction circuit having a solid-state imaging device according to a second embodiment.

FIG. 4 is a block diagram illustrating configurations of a vertical line correction circuit and a horizontal line correction circuit provided in the solid-state imaging device according to a second embodiment, in which like reference numerals denote like elements as in the first embodiment, and description thereof will not be repeated. Horizontal and vertical line correction circuits 31 and 32 include defect correction circuits 33 and 34, respectively.

The defect correction circuit 33 provided in the horizontal line correction circuit 31 carries out defect correction for the third black level signal. The arithmetic averaging unit 23 of the horizontal line correction circuit 31 obtains an arithmetic average of the third black level signal subjected to the processing of the defect correction circuit 33. The defect correction circuit 34 provided in the vertical line correction circuit 32 carries out defect correction for the black level signal transmitted to the vertical line correction circuit 32 after performing the adding/subtracting in the horizontal line correction circuit 31. The line memory 24 temporarily stores the black level signal subjected to the processing of the defect correction circuit 34.

When the row of the effective pixel portion 14 is selected by the VSR 16, the defect correction circuit 33 provided in the horizontal line correction circuit 31 carries out defect correction for the second black level signal. The arithmetic averaging unit 23 of the horizontal line correction circuit 31 obtains an arithmetic average of the black level signal subjected to the processing of the defect correction circuit 33 for each row and adds/subtracts the obtained arithmetic average to/from the effective pixel signal. The vertical line correction circuit 32 adds/subtracts the arithmetic average obtained by the arithmetic averaging unit 25 to/from the effective pixel signal subjected to the adding/subtracting in the horizontal line correction circuit 31. The defect correction circuit 34 provided in the vertical line correction circuit 32 carries out defect correction for the effective pixel signal subjected to the adding/subtracting of the arithmetic average in the vertical line correction circuit 32.

The defect correction circuit 33 provided in the horizontal line correction circuit 31 carries out defect correction, for example, by substituting a signal value with that of the pixel arranged in parallel in a row direction. The defect correction circuit 34 provided in the vertical line correction circuit 32 carries out defect correction, for example, by substituting a signal value with that of the pixel arranged in parallel in a column direction. The solid-state imaging device can carry out defect correction appropriate for each of the horizontal line correction and the vertical line correction by configuring the horizontal line correction circuit 31 and the vertical line correction circuit 32 with the defect correction circuits 33 and 34, respectively.

The defect correction circuit 33 provided in the horizontal line correction circuit 31 suppresses influence of the defect generated in the second and third OB portions 12 and 13 by carrying out defect correction for the black level signal before performing the arithmetic averaging in the arithmetic averaging unit 23. The defect correction circuit 34 provided in the vertical line correction circuit 32 suppresses influence of the defect generated in the first OB portion 11 by carrying out defect correction for the black level signal before performing the arithmetic averaging in the arithmetic averaging unit 25. The solid-state imaging device can carry out accurate correction of both the vertical line noise and the horizontal line noise by suppressing influence of the defect generated in the OB portion so that it is possible to further improve image quality.

Furthermore, since the defect correction circuit 34 provided in the vertical line correction circuit 32 carries out defect correction for the effective pixel signal subjected to the adding/subtracting of the arithmetic average, it is possible to obtain a high-quality image in which influence of the defect is suppressed using the solid-state imaging device. Since the solid-state imaging device uses the defect correction circuit 34 provided in the vertical line correction circuit 32 for both the defect correction of the OB portions 11, 12, and 13 and the defect correction of the effective pixel portion 14, it is possible to reduce a circuit size in comparison with a case where, a separate defect correction circuit is provided for the effective pixel portion 14.

The defect correction circuits 33 and 34 determine whether or not a defect exists, for example, by comparing with a predetermined threshold value. Since the black level signals from the OB portions 11, 12, and 13 have a stable signal level in comparison with the effective pixel signal from the effective pixel portion 14, it is possible to detect a defect with high precision even when the threshold value used to determined whether or not a defect exists in the OB portions 11, 12, and 13 are set to be smaller than the threshold value for determining whether or not a defect exists in the effective pixel portion 14.

While certain embodiments have been described, these embodiments have been presented by way of example only, and are not intended to limit the scope of the inventions.

Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A solid-state imaging device comprising:
a pixel unit in which a photoelectric conversion element and a detection portion for converting a signal charge from the photoelectric conversion element into a voltage are arranged in a 2-dimensional direction;
an A/D conversion circuit that converts a signal read from the pixel unit into a digital signal; and
a signal processing circuit that carries out operational processing of the digital signal obtained by the A/D conversion circuit,
wherein the pixel unit includes:
an effective pixel portion that generates an effective pixel signal depending on a light amount incident to the photoelectric conversion element, and
an optical black portion that generates a black level signal representing a lowest gradation level by optically shielding the photoelectric conversion element,
wherein the optical black portion includes:
a first optical black portion arranged in parallel with the effective pixel portion in a column direction to generate a first black level signal,
a second optical black portion arranged in parallel with the effective pixel portion in a row direction to generate a second black level signal, and
a third optical black portion arranged in parallel with the first optical black portion in a row direction and arranged in parallel with the second optical black portion in a column direction to generate a third black level signal,
wherein the signal processing circuit includes:
a vertical line correction circuit that carries out arithmetic averaging of the first black level signal for each column and adds/subtracts a result of the arithmetic averaging to/from the effective pixel signal, and
a horizontal line correction circuit that carries out arithmetic averaging of the second black level signal for each row and adds/subtracts a result of the arithmetic averaging to/from the effective pixel signal, and
wherein at least one of the vertical line correction circuit and the horizontal line correction circuit adds/subtracts the arithmetic average of the third black level signal to/from the first or second black level signal.

2. The solid-state imaging device according to claim 1, wherein the horizontal line correction circuit adds/subtracts the arithmetic average of the third black level signal for each row to/from the first black level signal and transmits a result of the adding/subtracting to the vertical line correction circuit.

3. The solid-state imaging device according to claim 1, wherein the vertical line correction circuit adds/subtracts the arithmetic average of the third black level signal for each column to/from the second black level signal and transmits a result of the adding/subtracting to the horizontal line correction circuit.

4. The solid-state imaging device according to claim 1, wherein the signal processing circuit further includes a defect correction circuit that carries out defect correction of the black level signal, and the defect correction circuit is provided in each of the vertical line correction circuit and the horizontal line correction circuit.

5. The solid-state imaging device according to claim 4, wherein the defect correction circuit provided in the horizontal line correction circuit carries out defect correction for the black level signal before performing the arithmetic averaging in the horizontal line correction circuit, and the defect correction circuit provided in the vertical line correction circuit carries out defect correction for the black level signal before performing the arithmetic averaging in the vertical line correction circuit.

6. The solid-state imaging device according to claim 4, wherein the defect correction circuit provided in the vertical line correction circuit further carries out defect correction for the effective pixel signal.

7. A camera module comprising:
a lens unit that receives light from a subject;
a solid-state imaging device that generates an image signal depending on the light received by the lens unit; and
an image processing device that carries out image processing for the image signal from the solid-state imaging device,
wherein the solid-state imaging device includes:
a pixel unit in which a photoelectric conversion element and a detection portion for converting a signal charge from the photoelectric conversion element into a voltage are arranged in a 2-dimensional direction,
an A/D conversion circuit that converts a signal read from the pixel unit into a digital signal, and
a signal processing circuit that carries out operational processing of the digital signal obtained by the A/D conversion circuit,
wherein the pixel unit includes:
an effective pixel portion that generates an effective pixel signal depending on a light amount incident to the photoelectric conversion element, and
an optical black portion that generates a black level signal representing a lowest gradation level by optically shielding the photoelectric conversion element,
wherein the optical black portion includes:
a first optical black portion arranged in parallel with the effective pixel portion in a column direction to generate a first black level signal,
a second optical black portion arranged in parallel with the effective pixel portion in a row direction to generate second black level signal, and
a third optical black portion arranged in parallel with the first optical black portion in a row direction and arranged in parallel with the second optical black portion in a column direction to generate a third black level signal,
wherein the signal processing circuit includes:
a vertical line correction circuit that carries out arithmetic averaging of the first black level signal for each column and adds/subtracts a result of the arithmetic averaging to/from the effective pixel signal, and
a horizontal line correction circuit that carries out arithmetic averaging of the second black level signal for each row and adds/subtracts a result of the arithmetic averaging to/from the effective pixel signal, and
wherein at least one of the vertical line correction circuit and the horizontal line correction circuit further adds/subtracts the arithmetic average of the third black level signal to/from the first black level signal or the second black level signal.

8. The camera module according to claim 7,
wherein the horizontal line correction circuit adds/subtracts the arithmetic average of the third black level signal for each row to/from the first black level signal and transmits a result of the adding/subtracting to the vertical line correction circuit.

9. The camera module according to claim 7,
wherein the vertical line correction circuit adds/subtracts the arithmetic average of the third black level signal for each column to/from the second black level signal and transmits a result of the adding/subtracting to the horizontal line correction circuit.

10. The camera module according to claim 7,
wherein the signal processing circuit further includes a defect correction circuit that carries defect correction for the black level signal, and
the defect correction circuit is provided in each of the vertical line correction circuit and the horizontal line correction circuit.

11. The camera module according to claim 10,
wherein the defect correction circuit provided in the horizontal line correction circuit carries out defect correction for the black level signal before performing the arithmetic averaging in the horizontal line correction circuit, and
the defect correction circuit provided in the vertical line correction circuit carries out defect correction for the black level signal before performing the arithmetic averaging in the vertical line correction circuit.

12. The camera module according to claim 10,
wherein the defect correction circuit provided in the vertical line correction circuit further carries out defect correction for the effective pixel signal.

13. An imaging method comprising:
generating an effective pixel signal depending on a light amount incident to a photoelectric conversion element in an effective pixel portion out of a pixel unit in which the photoelectric conversion element and a detection portion for converting a signal charge from the photoelectric conversion element into a voltage are arranged in a 2-dimensional direction;
generating a black level signal representing a lowest gradation level in an optical black portion for optically shielding the photoelectric conversion element out of the pixel unit; and
performing operational processing of the black level signal and the effective pixel signal read from the pixel unit,
wherein the black level signal includes:
a first black level signal obtained from a first optical black portion arranged in parallel with the effective pixel portion in a column direction out of the optical black portion,
a second black level signal obtained from a second optical black portion arranged in parallel with the effective pixel portion in a row direction out of the optical black portion, and
a third black level signal obtained from a third optical black portion arranged in parallel with the first optical black portion in a row direction and arranged in parallel with the second optical black portion in a column direction out of the optical black portion,
wherein the operational processing includes:
vertical line correction in which arithmetic averaging of the first black level signal is carried out for each column, and a result of the arithmetic averaging is added/subtracted to/from the effective pixel signal, and
horizontal line correction in which arithmetic averaging of the second black level signal is carried out for each row, and a result of the arithmetic averaging is added/subtracted to/from the effective pixel signal, and
wherein, in at least one of the vertical line correction and the horizontal line correction, the arithmetic average of the third black level signal is added/subtracted to/from the first black level signal or the second black level signal.

14. The imaging method according to claim 13,
wherein the horizontal line correction includes adding/subtracting the arithmetic average of the third black level signal for each row to/from the first black level signal and transmitting a result of the adding/subtracting for the vertical line correction.

15. The imaging method according to claim 13,
wherein the vertical line correction includes adding/subtracting the arithmetic average of the third black level signal for each column to/from the second black level signal and transmitting a result of the adding/subtracting for the horizontal line correction.

16. The imaging method according to claim 13,
wherein each of the horizontal line correction and the vertical line correction includes carrying out defect correction for the black level signal.

17. The imaging method according to claim 16,
wherein the defect correction of the horizontal line correction is carried out for the black level signal before performing the arithmetic averaging in the horizontal line correction, and
the defect correction of the vertical line correction is carried out for the black level signal before performing the arithmetic averaging in the vertical line correction.

18. The imaging method according to claim 16,
wherein a circuit for the defect correction of the vertical line correction further carries out the defect correction for the effective pixel signal.

* * * * *